Patented Jan. 6, 1925.

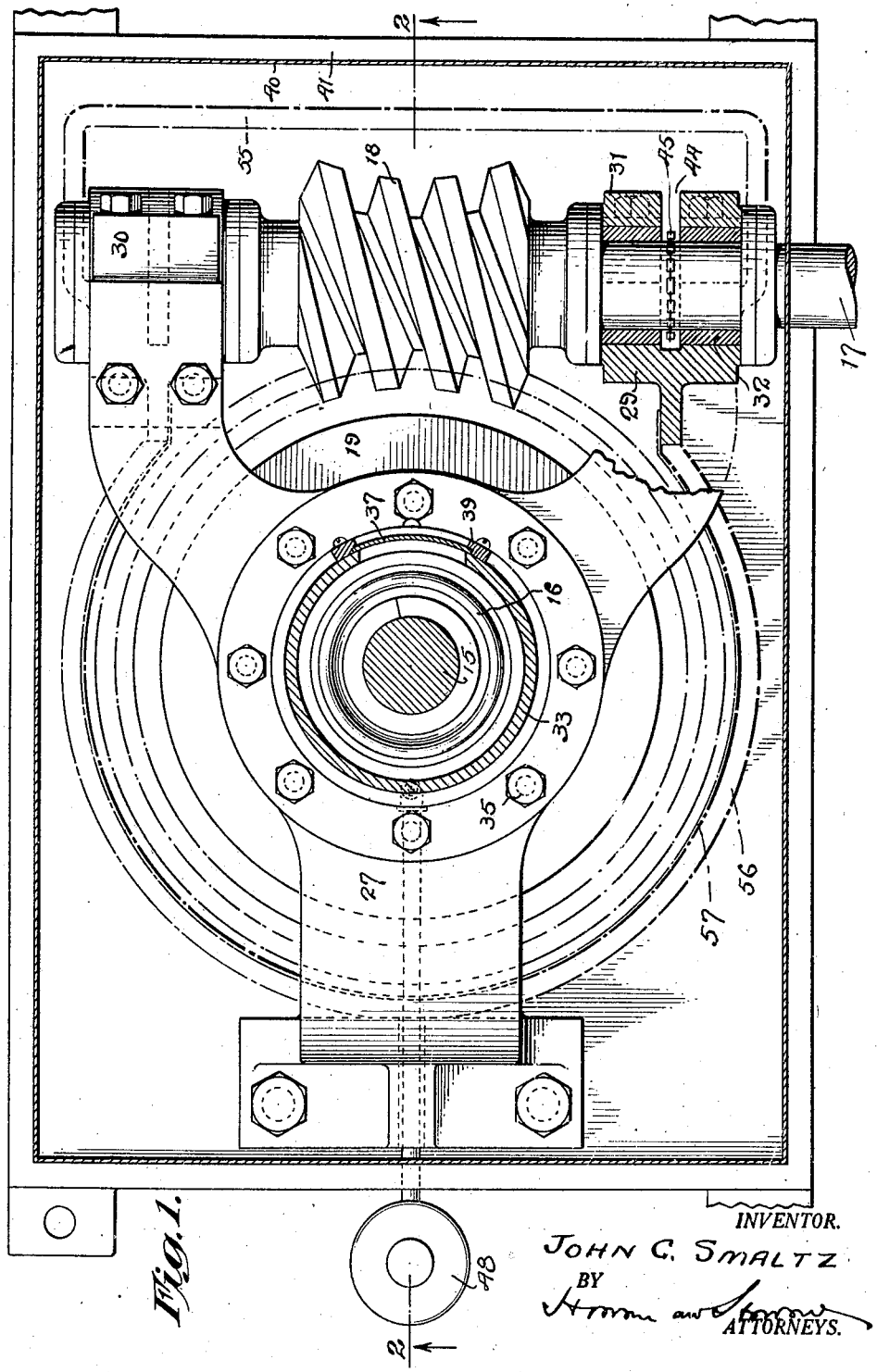

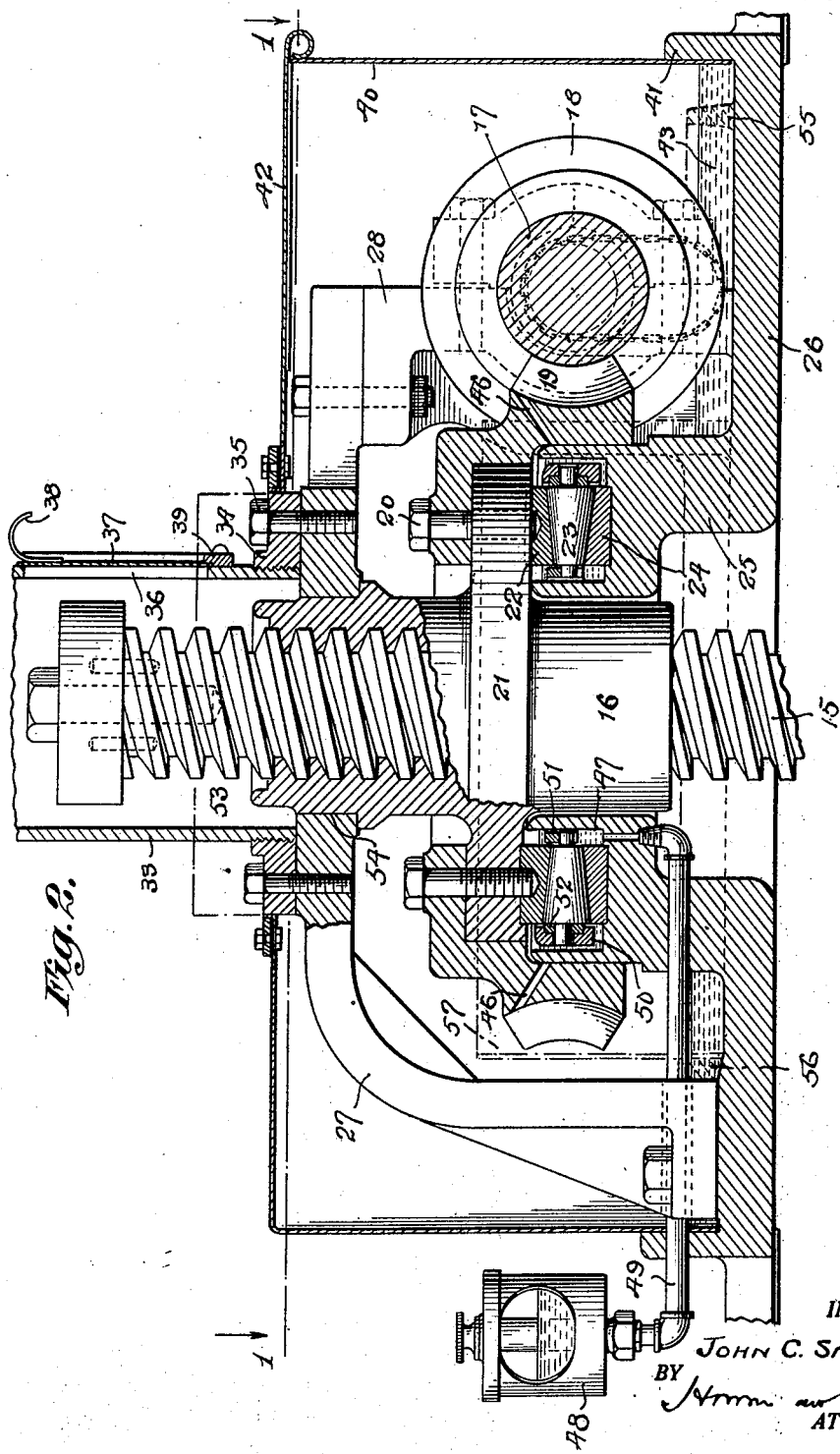

1,522,337

UNITED STATES PATENT OFFICE.

JOHN C. SMALTZ, OF SHORT HILLS, NEW JERSEY.

LIFTING AND LOWERING GEAR.

Application filed April 12, 1924. Serial No. 706,218.

*To all whom it may concern:*

Be it known that I, JOHN C. SMALTZ, a citizen of the United States of America, residing at Short Hills, in the county of Union and State of New Jersey, have invented certain new and useful Improvements in Lifting and Lowering Gears, of which the following is a specification.

My invention relates to lifting and lowering gear, and particularly to gear for raising and lowering tidewater ferry bridges and the like. The object of my invention is to provide a gear of improved structure and arrangement of parts by which manufacture and assembly are facilitated, and thorough lubrication of all wearing parts is insured.

In the accompanying drawings—

Fig. 1 is a broken horizontal section on the line 1—1, Fig. 2; and

Fig. 2 is a broken vertical section on the line 2—2, Fig. 1.

Inasmuch as the general layout of the bridge and hoisting connections are well known in this art, illustration thereof is omitted. It suffices to say that gear of the general type to which the present invention relates is applied to each of the vertical lifting screws which is held against rotation and is connected by links, chains, or the like to the free end of the bridge, and by means of which the latter is raised or lowered to meet the level of the float or ferry with which the bridge co-operates at all stages of the tide. A general layout of this character is shown in the patent to Condict et al. No. 824,627, dated June 26, 1906.

Referring to the drawings, the hoisting mechanism comprises a vertically movable screw 15 of considerable length, which is held against rotation and the lower end of which is connected to the bridge-hoisting links or chains (not shown). Vertical movement is imparted to the screw by the rotary nut 16 which is operated by the motor-driven shaft 17 through its worm 18 and the worm wheel 19 bolted at 20 to the peripheral bearing flange 21 of the nut. The nut 16 thus supports the screw 15 and such portion of the bridge load as is not taken care of by the usual counterweights.

Secured to the lower face of the flange 21 is a beveled bearing ring 22 which rests upon a group of anti-friction conical rollers 23. The lower bevelled bearing ring 24, on which the rollers 23 run, is mounted on the heavy raised boss formed by the annular flange 25 of the base plate 26, the latter being supported upon suitable structural frame members. An upper bearing for the nut is afforded by the Y-frame 27, the down leg of which is secured directly to the base plate 26, while the forked end is connected to the bearing standards 28 and 29, in which the worm spindle 17 is journalled. Laterally removable bearing caps 30 and 31 screwed to the standards 28 and 29 support the bearing bushings 32, in which the spindle rotates.

A dust cap 33 of sufficient length to house the screw 15 in its fully raised position, is supported on the frame 27 by means of the screw flange 34 bolted to the frame at 35. An inspection port 36 in the dust cap adjacent the bearing is normally closed by a gate 37 with finger grip 38, by which it may be lifted vertically out of its guide 39.

The bearing as a whole is housed within a casing 40, the sides of which are engaged within the marginal flange 41 of the base plate 26. A door 42 in the top of the casing overlies the worm 18 and permits ready inspection of the interior of the housing and the introduction of lubricant.

It will be realized that the lubrication of gear performing such heavy duty as the present is an important consideration. It will also be realized that this service is apt to be neglected, since the gear motor (not shown) is universally operated by an unskilled bridge attendant through a remote control switch. It is very important therefore that the lubrication system be of the self-contained type, which requires only occasional inspection and attention by a qualified machinist.

A large oil pan is afforded between the raised bearing boss 25 and the marginal flange 41 of the base plate 16. This pan is filled with a heavy oil 43 appropriate for the lubrication of the worm, the worm shaft, the worm wheel and the bearing of the latter against the side of the boss 25. As will be noted, the worm 18 dips into the oil and thus carries it to the teeth of the worm wheel 19. On the worm shaft 17, at gaps 44 in the bearings, are arranged chains 45, the lower ends of which dip into the oil and lift it to the bearings as the shaft rotates in either direction. The bearing between the inner periphery of the worm wheel 19 and the boss 25 receives oil through downwardly inclined holes 46 formed in the worm wheel, and into which the oil lifted by the worm 18 is scraped by the meshing teeth of the worm wheel. The lubrication of this bearing is quite important inasmuch as the lateral thrust exerted by the worm 18 upon the worm wheel is taken at this point.

The roller bearings 23 and the bearing rings 22 and 24 are located in the deep annular channel 47 formed in the upper face of the boss 25. The walls of this channel extend above the bearing area of the worm wheel on the boss, as well as above the flange 41 which limits the level of the oil 43 in the base pan. It is thus possible to use another type of lubricant at this point, and I prefer a lighter oil which is confined in the channel 47. The channel is filled to an appropriate level and as the oil is consumed it is replenished from an exterior reservoir 48, which communicates with the channel through pipe 49.

Spacing rings 50 and 51 at opposite sides of the bearing rings 22 and 24 receive the bearing studs of the rollers 23 and keep the latter properly spaced and in proper radial position with respect to the axis of the nut 16. The ring 50 is relatively heavy and is provided with bearing washers 52 which take the outward thrust of the rollers 23 against the ring. This bearing is also lubricated by the oil in the channel 47.

The screw 15 and its bearing in the nut 16 are lubricated by heavy grease smeared upon the screw, while it is in raised position, so that as it works down through the nut, the surplus grease is confined in the chamber 53 above the nut afforded by the lower portion of the dust cap 33. This grease also works into the bearing 54 between the nut and the frame 27 and lubricates this also.

It will be observed that all lubricant is thus confined within channels or chambers of the housing or structural members of the bearing, and that there is little chance of its escape, or of resulting objectionable drip.

I have also indicated a possible limitation of the oil pan to the central area of the base by means of a wall 55 spaced inward from the marginal flange 41, and continued at 56 from the standards 29. A splash apron 57 may also be provided to surround the worm wheel 19. But I prefer the larger oil pan afforded by the entire base, and to utilize the wall of the casing 40 to catch the oil thrown off by the wheel during its rotation. The greater quantity of oil thus provided relieves the necessity for more frequent attention by a machinist, and no objectionable drip has been found to occur.

What I claim as my invention is—

1. The combination with a vertically reciprocal lifting screw, of a rotatable nut for supporting and imparting longitudinal movement thereto, said nut comprising a peripheral supporting flange, a worm wheel secured to and downwardly offset from said flange, and an annular support upon which said flange rests, and with the periphery of which said worm gear has a bearing.

2. The combination with a vertically reciprocal lifting screw, of a rotatable nut for supporting and imparting longitudinal movement thereto, said nut comprising a peripheral supporting flange, a worm wheel secured to and downwardly offset from said flange, a base plate through which the screw freely passes, an upstanding annular flange on the base plate surrounding the screw, said flange forming a supporting boss on the upper face of which said nut flange rests and with the periphery of which the worm gear has a bearing.

3. In a lifting screw gear, a base plate apertured to permit the free passage of a lifting screw therethrough, an upstanding annular flange surrounding said aperture and forming a bearing boss, the upper face of said boss being recessed to afford an annular oil channel, upper and lower bearing rings and interposed roller bearings arranged in said channel, a rotatable nut adapted to engage the screw thread, and having a peripheral supporting flange rigid with said upper bearing ring, a worm wheel secured to said flange and offset downward therefrom, and having a bearing on the periphery of said boss.

4. In a lifting screw gear, a base plate centrally apertured to permit the vertical play of a lifting screw therethrough, a marginal upstanding flange on the base plate, and an upstanding annular boss surrounding the central aperture in said base plate and rising to a level materially higher than the marginal flange, the upper surface of said boss being recessed to form an annular channel, a rotatable nut for supporting and imparting longitudinal movement to the screw, said nut having a peripheral flange, bearing elements arranged in said annular channel and upon which the flange of said nut rests, means for supplying lubricant to said channel, and driving gear for the nut arranged above the base plate and extending below the level of the marginal flange of the base plate to take up lubricant from the oil pan afforded between the boss and flange of the base plate.

5. In a lifting screw gear, a base plate apertured to permit the lifting screw to pass therethrough, an upstanding flange surrounding said aperture and forming a bearing boss, a rotatable nut supported on said boss for imparting longitudinal movement to the screw, a worm wheel secured to the nut and having a bearing on the periphery of said boss, a frame member rising from said base plate and affording a bearing for the nut at a point spaced from said boss, standards rising from the base plate and to which said frame is secured at one end, a worm shaft for driving the worm wheel secured to the nut, and laterally removable bearing caps secured to said standards for supporting the worm shaft on said standards.

6. In a lifting screw gear, a base plate apertured to permit the lifting screw to pass therethrough, an upstanding annular bearing boss surrounding said aperture, an upstanding flange spaced from said boss to form an oil pan between the flange and boss, an annular channel in the upper surface of the boss, and a feed reservoir connected to said channel for supplying lubricant thereto.

7. In a lifting screw gear, a base plate apertured to permit the passage of the screw therethrough, and having an upstanding annular boss surrounding the aperture in the plate, an upstanding marginal flange spaced from the boss and forming therewith an oil pan, a nut supported on said boss, a worm wheel secured to the nut and having a bearing on the periphery of the boss, a worm engaging the worm wheel and arranged to dip into the oil pan to lift lubricant therefrom, and a casing enclosing said parts and resting on the base plate within the marginal flange of the latter.

8. In a lifting screw gear, a base plate apertured to permit the passage of the screw therethrough, and having an upstanding annular boss surrounding the aperture in the plate, an upstanding marginal flange spaced from the boss and forming therewith an oil pan, a nut supported on said boss, a worm wheel secured to the nut and having a bearing on the periphery of the boss, a worm engaging the worm wheel and arranged to dip into the oil pan to lift lubricant therefrom, and means for lubricating the bearing of the worm wheel on the boss from the oil lifted by the worm from the oil pan.

9. In a lifting screw gear, a base plate apertured to permit the passage of the screw therethrough, and having an upstanding annular boss surrounding the aperture in the plate, an upstanding marginal flange spaced from the boss and forming therewith an oil pan, a nut supported on said boss, a worm wheel secured to the nut and having a bearing on the periphery of the boss, a worm engaging the worm wheel and arranged to dip into the oil pan to lift lubricant therefrom, and means for lubricating the bearing of the worm wheel on the boss from the oil lifted by the worm from the oil pan, together with bearings for the worm shaft above the level of the oil pan, and means for lifting lubricant from the oil pan to said bearings.

In testimony whereof I have signed my name to this specification.

JOHN C. SMALTZ.